United States Patent
Walters

(10) Patent No.: US 6,888,092 B2
(45) Date of Patent: May 3, 2005

(54) ELECTRODES AND NOZZLES HAVING IMPROVED CONNECTION AND QUICK RELEASE

(75) Inventor: Jeffrey Walters, Bradenton, FL (US)

(73) Assignee: American Torch Tip, Bradenton, FL (US)

(*) Notice: Subject to any disclaimer, the term of this patent is extended or adjusted under 35 U.S.C. 154(b) by 0 days.

(21) Appl. No.: 10/875,769

(22) Filed: Jun. 24, 2004

(65) Prior Publication Data

US 2004/0226920 A1 Nov. 18, 2004

Related U.S. Application Data

(62) Division of application No. 10/142,581, filed on May 9, 2002, now abandoned.

(51) Int. Cl.⁷ .............................................. B23K 10/00
(52) U.S. Cl. ........................... 219/121.52; 219/121.48; 219/121.5; 219/137.61
(58) Field of Search .................. 219/121.11, 121.36, 219/121.48, 121.5, 121.51, 121.52, 137.31, 137.42, 137.44, 137.2, 74–75, 121.42

(56) References Cited

U.S. PATENT DOCUMENTS

| | | | |
|---|---|---|---|
| 3,469,070 A | 9/1969 | Bernard et al. | |
| 4,282,419 A | * 8/1981 | Auer | 219/137.44 |
| 5,023,425 A | 6/1991 | Severance, Jr. | |
| 5,440,100 A | 8/1995 | Stuart et al. | |
| 5,726,420 A | 3/1998 | Lajoie | |
| 5,760,373 A | 6/1998 | Colling | |
| 5,906,758 A | 5/1999 | Severance, Jr. | |
| 5,965,040 A | 10/1999 | Luo et al. | |
| 6,075,227 A | * 6/2000 | Lajoie | 219/137.61 |
| 6,163,008 A | 12/2000 | Roberts et al. | |
| 6,169,264 B1 | 1/2001 | Marhic | |
| 6,307,179 B1 | 10/2001 | Walters, III | |
| 6,329,627 B1 | 12/2001 | Walters | |

* cited by examiner

*Primary Examiner*—Tu Hoang
(74) *Attorney, Agent, or Firm*—Brouse McDowell; Roger Emerson; Timothy D. Bennett

(57) ABSTRACT

Electrode and nozzle that seat within a retaining member and in two different seating locations relative to retaining member. The electrode and nozzle each include an interwoven-double-start thread having two thread cuts, which start 180 degrees from one another as measured around the circumference of the electrode or nozzle. Further, the electrode, nozzle, and retaining member include mating frustum surfaces, which are configured and dimensioned so that the electrode and nozzle seat within the retaining member with less than one turn of the electrode and nozzle relative to the retaining member. Therefore, the electrode and nozzle may be quickly inserted in, and removed from, the retaining member.

3 Claims, 3 Drawing Sheets

ELECTRODES AND NOZZLES HAVING IMPROVED CONNECTION AND QUICK RELEASE

This application claims priority from and is a division of having Ser. No. 10/142,581, which was filed on May 9, 2002 now abandoned, and is incorporated herein by reference.

1. BACKGROUND OF THE INVENTION

A. Field of Invention

The present invention relates generally to a plasma torch and, more particularly, to a connection between a plasma torch electrode, nozzle, and a retaining member.

B. Description of the Related Art

Commonly used for working of metals, plasma arc torches are used for cutting, welding, surface treatment, melting, and annealing. These torches include an electrode that supports an arc that extends from the electrode to the workpiece in the transferred arc mode of operation. It is also conventional to surround the arc with a swirling vortex of gas, and in some torch designs, it is conventional to envelope the gas and arc with a swirling jet of water.

It is known in the art of metal inert gas (mig) welding, that the welding gun contact tip must satisfactorily perform two important functions. First, it must accurately guide a weld wire to the point of contact with the work piece. Second, it must conduct adequate current, which can be as high as 400 amps or more, to the weld wire. To achieve those results, it is known to provide a relatively long contact tip made of copper and having an axial hole therethrough. The hole is sized slightly larger than the diameter of the weld wire. The contact tip extends from a gas diffuser through which an inert gas is directed around the welding arc. Current to the contact tip is supplied to it through the gas diffuser.

Due to the severe operating conditions, contact tips have relatively short service lives. Consequently, they are treated as consumable items in the industry. Typically, contact tips are made as separate pieces that are threaded into a gas diffuser. The thread is a single thread and, therefore, each contact tip has only one seating location with respect to the gas diffuser. When a contact tip has worn, it is threaded out of the gas diffuser, is discarded, and a new one is screwed into its seating location.

As noted above, in addition to heating caused by the welding arc, another potential source of heat to the contact tip is the threads between it and the gas diffuser. That is, the threads can cause resistance heating. To minimize electrical resistance, the contact tip and gas diffuser threads have a relatively long engagement length and a fine pitch. However, the long engagement, fine pitch, thread presents a problem. Removing a worn contact tip from the gas diffuser requires several turns of the contact tip. If the weld wire has burned back and fused to the contact tip, the weld wire must twist through the same number of turns as the contact tip. The potential springback of the fully removed contact tip due to the twisted weld wire is annoying if not potentially dangerous. Moreover, the time required to disassemble the multiple-turn contact tip also contributes to downtime of the welding production area.

Although the prior art has individually addressed the problems of short service life of a contact tip, resistance heating, and quick replacement of a contact tip, there has not been one convenient configuration that solves all of these problems.

U.S. Pat. No. 5,440,100 to Stuart et al. and U.S. Pat. No. 3,469,070 to Bernard et al. each discloses a contact tip that can be seated in two different positions within a gas diffuser. Stuart and Bernard use a projection on the gas diffuser, wherein the projection fits into a groove on the contact tip. But such a connection is weak both mechanically, and electrically. Mechanically, there is only a point contact between the gas diffuser and contact tip that holds them together. In Stuart, a dimple or protrusion extends from the gas diffuser; however, the dimple is subject to wear each time a contact tip is inserted within the gas diffuser thereby making the mechanical connection loose over time. In Bernard, a set screw in the gas diffuser extends into a bore that receives the contact tip. The tip of the set screw fits into recessed guideways on the contact tip. But the set screw may loosen due to vibration during use of the welding gun and, therefore, weaken the mechanical connection between the contact tip and gas diffuser. Further, the point contact tends to loosen easily thereby allowing the contact tip to rattle within, and quite possibly come out of, the gas diffuser, which would be a big problem during welding operations. Electrically, each Stuart and Bernard suffers the drawback of resistance heating near the limited point contact between the projection and the groove that hold the parts together.

U.S. Pat. No. 5,760,373 to Colling addresses the problem of resistance heating by providing a welding device having a tapered connection between a contact tip and a gas diffuser. However, Colling still suffers the drawback of requiring a full turn of the contact tip to remove or insert it within the gas diffuser. Moreover, Colling's contact tip seats in only one position relative to the gas diffuser and, therefore, suffers the additional drawback of a short service life.

Similarly to Colling, U.S. Pat. No. 5,726,420 to Lajoie provides a welding device having a tapered connection between a contact tip and a gas diffuser. Lajoie claims to enable quick replacement of the contact tip, however, Lajoie's device requires 2½ turns of the contact tip relative to the gas diffuser in order to remove or insert it. Lajoie's required 2½ turns is still quite time consuming and, therefore, contributes to a long downtime during replacement of the contact tip. Further, Lajoie's electrode seats in only one position relative to the gas diffuser and, therefore, suffers the additional drawback of a short service life.

U.S. Pat. No. 5,023,425 (Severance, Jr.) which issued on Jun. 11, 1991, and which is incorporated herein by reference, discloses an electrode for a plasma arc torch wherein the electrode includes a copper holder having a lower end that mounts an emissive insert that acts as the cathode terminal for the arc during operation.

II. SUMMARY OF THE INVENTION

It is an object of the present invention to overcome the disadvantages of the prior art by providing a plasma apparatus configuration that solves the problems of short service life, resistance heating, and quick replacement of the plasma tip, with one simple design. It is another object of the invention to provide a plasma apparatus with a plasma electrode and plasma tips that have longer service lives than conventional plasma electrodes and plasma tips, thereby reducing the cost of operating the plasma apparatus. Further, it is an object of the present invention to provide a plasma apparatus in which plasma electrodes, plasma tips, and a plasma torch quickly may be connected and disconnected, thereby reducing the time necessary for replacement of the plasma electrode and plasma tip and thus decreasing downtime of a plasma production area. Further, although the plasma electrode and plasma tip may be quickly removed and inserted within the plasma torch, the present invention provides a strong connection therebetween, which also minimizes resistance heating.

In accordance with the present invention, a plasma apparatus is provided with a plasma electrode and plasma tip having a longer service life. In order to provide longer service life, the plasma electrode and plasma tip have an interwoven-double-start thread, wherein the thread-cut starting points are 180 degrees from one another. Additionally, the plasma torch has a plasma electrode- and plasma tip-mating thread which is also an interwoven-double-start thread, wherein the thread-cut starting points are 180 degrees from one another. By providing an interwoven-double-start thread on the plasma electrode, plasma tip, and the plasma torch, the plasma electrode and plasma tip may be seated in two positions, 180 degrees apart from one another, relative to the plasma torch.

Additionally, in accordance with the present invention, a quick release plasma electrode and plasma tip are provided that minimize resistance heating between the plasma electrode, plasma tip, and plasma torch. The plasma electrode, plasma tip, and plasma torch are designed to seat with less than one turn of the plasma electrode and plasma tip relative to the plasma torch, thereby reducing the time necessary to change a plasma electrode and plasma tip. Even though the plasma electrode and plasma tip seat with less than one turn, the connection between them and a plasma torch is strong because of the interwoven-double-start threads. The interwoven-double-start threads, on the plasma electrode, plasma tip, and plasma torch, provide a longer effective thread length—over less than one turn—as opposed to the conventional single thread. The longer effective thread length strengthens the connection as well as reduces resistance heating. Thus, the interwoven double-start threads reduce the resistance heating and increase connection strength while minimizing the number of turns required to seat the plasma electrode and plasma tip in the plasma torch. To further strengthen the connection between the plasma electrode, plasma tip, and plasma torch, as well as to reduce resistance heating, the plasma electrode, plasma tip, and plasma torch have mating frustum surfaces.

The upstream end of the plasma torch may be constructed to suit any desired plasma system. The various ports and passages for the gases may also take any desired shape. The downstream end of the plasma torch is provided with a frustum-shaped cavity having its apex end toward the plasma torch upstream end. The base of the frustum-shaped cavity terminates in an interwoven-double-start thread that terminates at the downstream edge of the plasma torch.

The downstream ends of the plasma electrode and plasma tip may be conventional.

With the plasma electrode and plasma tip assembled to the plasma torch, the entire area of the plasma electrode's and plasma tip's frustum is in intimate facing contact with the plasma torch's frustum-shaped cavity. In addition, the engaged areas of the interwoven double-start threads of the two parts are in contact. The large areas of contact between the two parts provide a strong connection, as well as enable them to handle heavy current with minimized resistance heating. Further, quick replacement is possible because less than one reverse turn of the plasma electrode and plasma tip is required to remove it from, and insert it into, the plasma torch.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
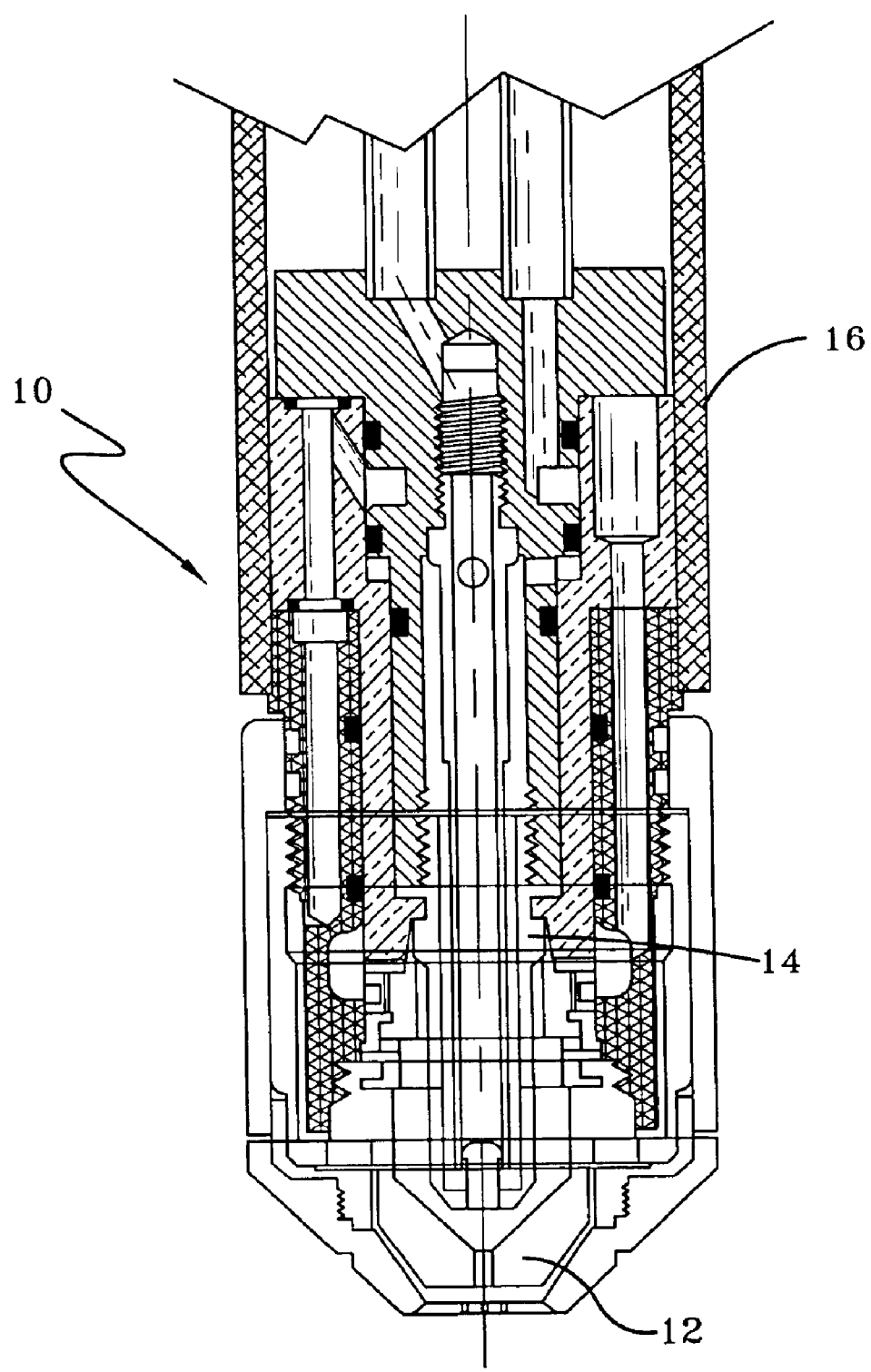
FIG. 1 is a sectional side view of a plasma arc torch, which embodies the features of the present invention.

Referring now to the drawings wherein the showings are for purposes of illustrating a preferred embodiment of the invention only and not for purposes of limiting the same, FIG. 1 shows a plasma arc torch. The plasma arc torch 10 includes a nozzle 12 and an electrode 14. The electrode 14 is made preferably of copper or a copper alloy.

In accordance with the present invention, the torch body 16 and electrode 14 are designed so that the electrode 14 can be seated, and used, in two different positions relative to the torch body 16. Further, the torch body 16 and electrode 14 are designed to provide a quick release, yet strong connection, therebetween while conducting maximum current to the work piece. In the embodiment shown in FIG. 2, the torch body 16 is generally tubular in shape, having an upstream end 11, a downstream end 17, and an axial passage 13. A first internal interwoven-double-start thread 18 is machined into the inside of the torch body 16 near the downstream end 17 of the axial passage 13. A second internal interwoven-double-start thread 19 is machined into the downstream end 17 of the axial passage 13.

The electrode 14 has an upstream end 21 and a downstream end 27. An external interwoven-double-start thread 24 is machined into the upstream end 21 of the electrode 14. The interwoven double-start thread 24 has the same diameter and pitch as the first interwoven-double-start thread 18 in the torch body 16.

A working end 25 of the electrode 14 extends from the interwoven-double-start thread 24 to the downstream end 27. The working end 25 may have a cylindrical surface, as shown, or any other suitable shape as, for example, that of a frustum, or combination of cylindrical surface and frustum. Additionally, the working end 25 may have a polygonal cross section. Further, when the working end 25 does not include a cross section having flat surfaces, it may be provided with wrench flats 28 to assist in turning the electrode 14 relative to the torch body 16.

The nozzle 12 has an upstream end 31 and a downstream end 37. An inside hole 36 extends axially through the interior of the nozzle 12 over its entire length. An external interwoven-double-start thread 34 is machined into the upstream end of the nozzle. The interwoven double-start thread 34 has the same diameter and pitch as the second interwoven-double-start thread 19 in the torch body 16.

Figure 3:
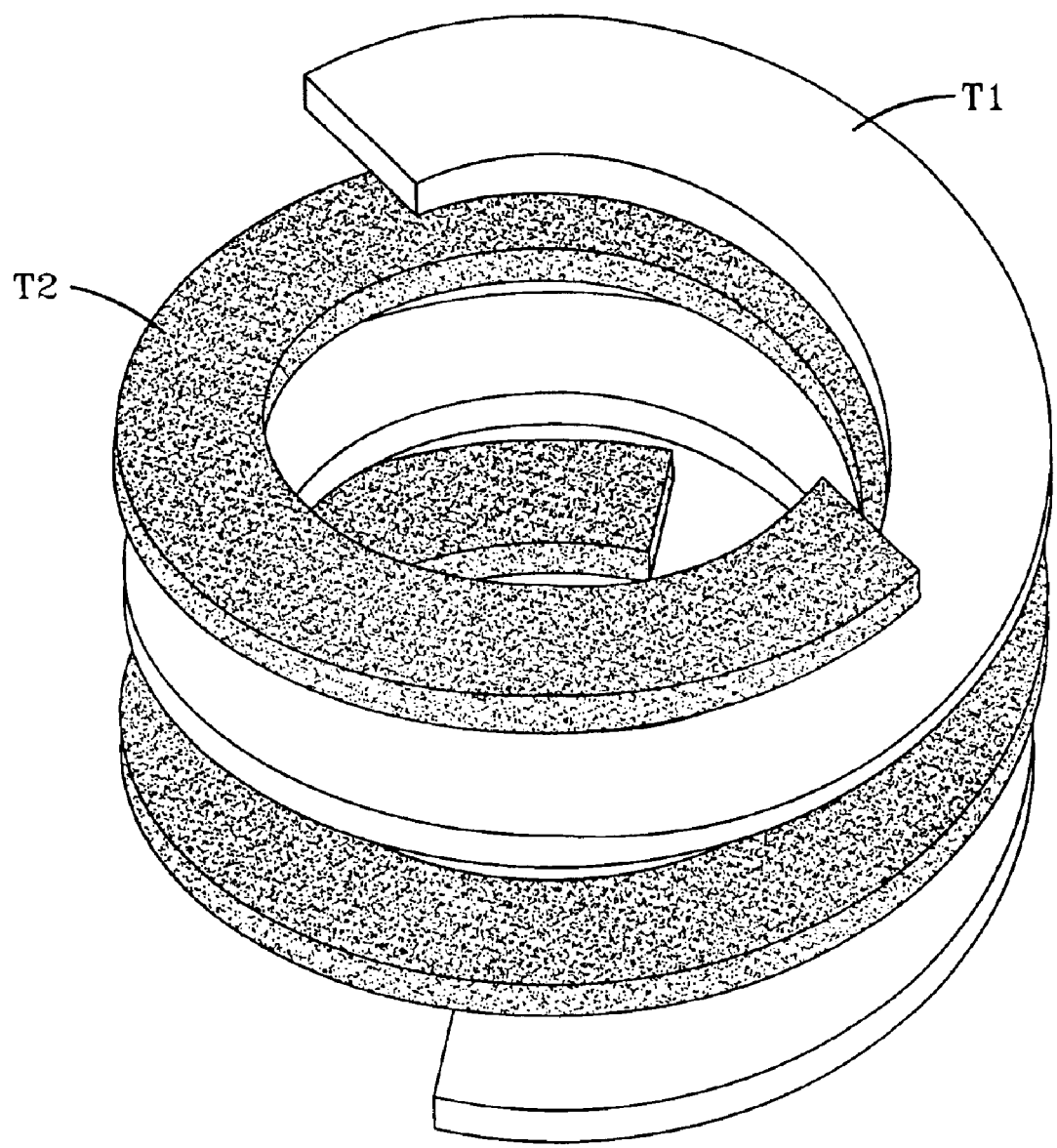
FIG. 3 is a schematic diagram of an interwoven-double-start thread, as is on the torch body, electrode, and nozzle of the present invention.

A schematic diagram of an interwoven-double-start thread is shown in FIG. 3. The schematic diagram is representative of each of the interwoven-double-start threads 18, 19 on the torch body, the interwoven-double-start thread 24 on the electrode, and the interwoven-doublestart thread 34 on the nozzle. That is, the interwoven-double-start threads 18, 19, 24, 34 are similar because they correspond to, and mate with, one another. As shown in FIG. 3, the interwoven-double-start thread pattern includes two thread cuts T1 and T2. The thread cuts T1 and T2 start in the same plane, but 180 degrees from one another, as measured around the circumference of the part on which they are located. Further, the turns of one thread cut, T1 for example, are disposed between adjacent turns of the other thread cut T2. That is, the thread cuts T1 and T2 alternate along an axial line extending parallel to the longitudinal axis of the part on which they are located. The interwoven-double-start threads 18, 19 include thread cuts that are similar to the schematic thread cuts T1 and T2, respectively, of FIG. 3. Similarly, the interwoven-double-start threads 24, 34 include thread cuts that are similar to the schematic thread cuts T1 and T2, respectively, of FIG. 3. The thread cuts are designed so that the interwoven-double-start threads 18, 19 in the torch body mate with the interwoven-double-start threads 24, 34 on the electrode and nozzle respectively.

Figure 2:
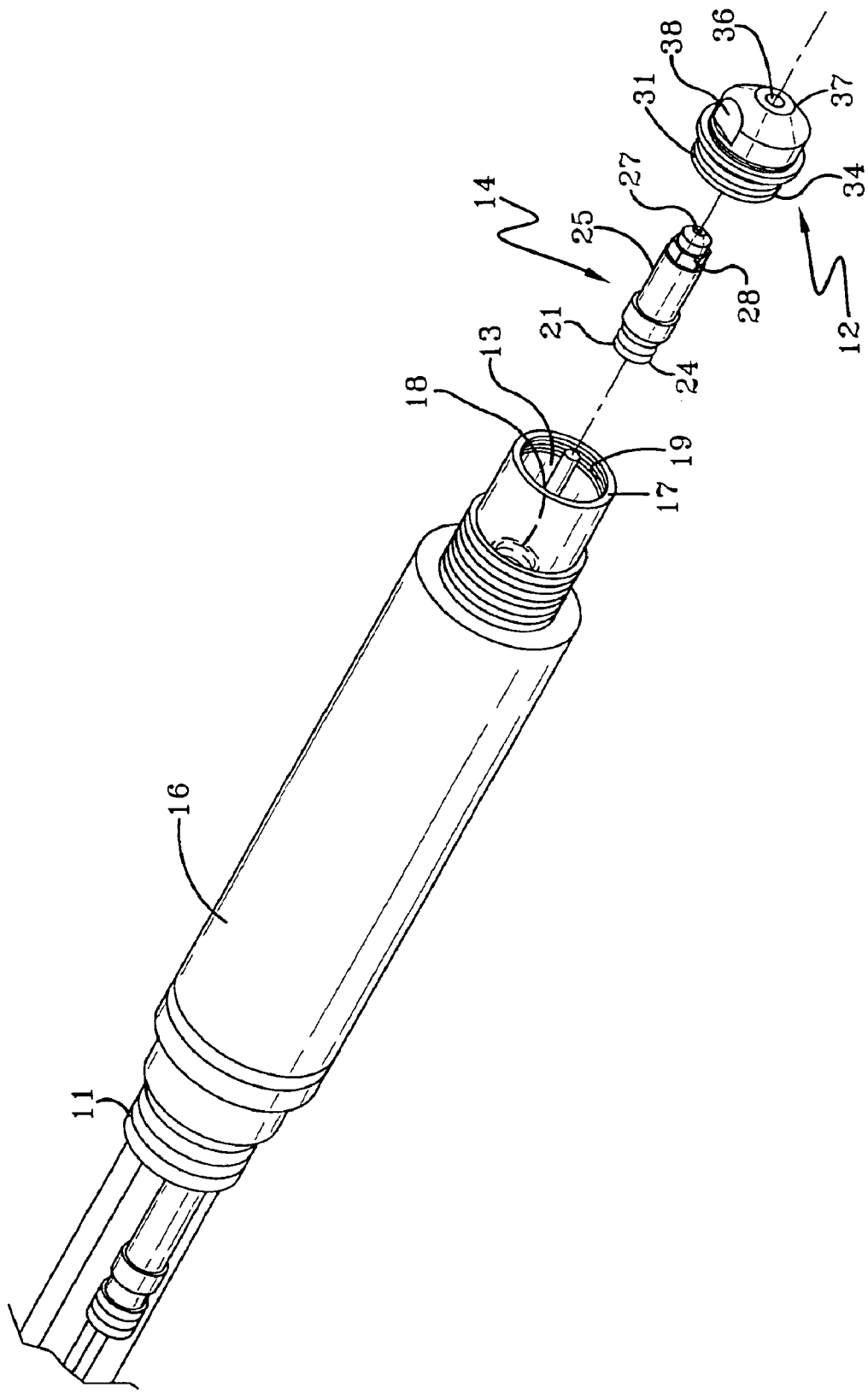
FIG. 2 is an exploded perspective view of a plasma torch body, electrode, and nozzle according to the present invention.

The torch body 16 and the electrode 14 are used by screwing the internal threads 18 of the torch body to the corresponding threads on the electrode 14. The electrode 14 is inserted into the downstream end 17 of the torch body until the electrode interwoven-double-start thread 24 contacts the torch body interwoven-double-start thread 18. The electrode 14 is then turned until the interwoven-double-start threads 18, 24 engage. The electrode 14 is further turned until the end 21 comes into contact with the torch body 16, as shown in FIG. 2, thereby connecting the electrode 14 to the torch body 16 in a first seating location. The interwoven-double-start threads 18, 24, are configured and dimensioned so that the electrode 14 mates with the torch body 16 after less than one turn of the electrode 14, after their interwoven-double-start threads 18, 24 have initially engaged, and before the electrode interwoven-double-start thread 24 has reached the end of the torch body interwoven-double-start thread 18. The same interrelationship applies to the torch body and the nozzle.

When it is necessary to remove an electrode 14 or a nozzle 12, less than one reverse turn is sufficient to release each from the torch body 16. Similarly, a new electrode 14 is assembled to the torch body 16 with less than one turn. Similarly, a new nozzle 12 is assembled to the torch body 16 with less than one turn. The entire replacement process is accomplished with very little downtime.

Moreover, although the electrode 14 is rotated less than one turn before seating within the torch body 16, there is a large area of contact therebetween. The interwoven-double-start threads 18, 24 contact one another. The large contact area provides the electrode 14 with a strong seat in the torch body 16. Additionally, when the electrode 14 is seated within the torch body 16, a considerable current can be conducted to the work piece by the torch body 16 and electrode 14 because of the large area of contact between the two parts. Consequently, resistance heating in and between the parts during operation of the plasma torch 10 is minimal.

It is contemplated that numerous modifications may be made to the plasma welding device of the present invention without departing from the spirit and scope of the invention as defined in the following claims. For example, an electrode and torch body could, of course, have an interwoven-double-start thread whereas another electrode and torch body could then include a single thread having a pitch corresponding to one thread cut of the interwoven-double-start thread. With such an arrangement, the electrode would still be able to seat in two different locations with respect to the torch body thereby extending the service life of the electrode.

The remaining plasma arc torch structure is conventional and is disclosed in the '425 patent mentioned above, which is incorporated herein by reference.

A power supply P, not shown, is connected to the torch electrode 14 in a series circuit relationship with a metal work piece, which is typically grounded. In operation, the plasma arc is established between the electrode 14 of the torch 10, which acts as the cathode terminal for the arc, and the work piece which is connected to the anode of the power supply, and which is positioned below the nozzle 12. The plasma arc is started in a conventional manner by momentarily establishing a pilot arc between the electrode 14 and the nozzle 12.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An electrode for supporting an arc in a plasma arc torch comprising:

a body having a first end, a second end, and a longitudinal axis, wherein the first end is opposite to the second end along the longitudinal axis, wherein the first end of the body includes an interwoven-double-start thread, and wherein the interwoven-double-start thread includes two thread cuts, each of the two thread cuts having a transverse profile with a base that tapers to a flat crest.

2. An electrode as claimed in claim 1, wherein the interwoven-double-start thread comprises two thread cuts that start at positions that are 180 degrees from one another as measured around the circumference of the body.

3. An electrode as claimed in claim 1, wherein the interwoven-double-start thread comprises a first thread cut and a second thread cut which are interwoven so that the first thread cut alternates with the second thread cut along a line parallel to the body longitudinal axis.

* * * * *